(12) United States Patent
Boughton

(10) Patent No.: US 6,755,608 B2
(45) Date of Patent: Jun. 29, 2004

(54) WIND TURBINE ENHANCEMENT APPARATUS, METHOD AND SYSTEM

(76) Inventor: Morris William Boughton, 84 Billy Mitchelle, Brownsville, TX (US) 78521

(*) Notice: Subject to any disclaimer, the term of this patent is extended or adjusted under 35 U.S.C. 154(b) by 103 days.

(21) Appl. No.: 10/081,390

(22) Filed: Feb. 22, 2002

(65) Prior Publication Data

US 2002/0114692 A1 Aug. 22, 2002

Related U.S. Application Data

(60) Provisional application No. 60/270,704, filed on Feb. 22, 2001, and provisional application No. 60/325,346, filed on Sep. 27, 2001.

(51) Int. Cl.$^7$ .................................. F03D 11/04
(52) U.S. Cl. ................. 415/4.5; 415/213.1; 416/244 R
(58) Field of Search ............... 415/4.5, 4.1–4.4, 415/3.1, 213.1, 208.1, 220, 221, 908; 416/244 R

(56) References Cited

U.S. PATENT DOCUMENTS

| | | | |
|---|---|---|---|
| 665,810 A | 1/1901 | Stretch | |
| 717,939 A | 1/1903 | Hernandez | |
| 1,015,416 A | 1/1912 | Bennett | |
| 1,233,232 A | 7/1917 | Heyroth | |
| 1,298,247 A | 3/1919 | Muller | |
| 1,687,181 A | 10/1928 | Prease | |
| 1,923,971 A | 8/1933 | Evans | |
| 1,944,239 A | 1/1934 | Honnef | |
| 4,006,925 A | 2/1977 | Scherer | |
| 4,018,543 A * | 4/1977 | Carson et al. | 415/2 |
| 4,070,131 A * | 1/1978 | Yen | 415/3 |
| 4,105,362 A | 8/1978 | Sforza | |
| 4,112,311 A * | 9/1978 | Theyse | 290/44 |
| 4,134,708 A | 1/1979 | Brauser et al. | |
| 4,164,382 A * | 8/1979 | Mysels | 415/2 |
| 4,396,843 A | 8/1983 | Parra | |
| 4,433,544 A | 2/1984 | Wells et al. | |
| 4,447,738 A | 5/1984 | Allison | |
| 4,616,973 A | 10/1986 | Souchik, Jr. | |
| 4,963,761 A * | 10/1990 | Wight | 290/55 |
| 4,970,404 A | 11/1990 | Barger | |
| 5,300,817 A * | 4/1994 | Baird | 290/55 |
| 5,758,911 A | 6/1998 | Gerhardt | |
| 5,992,341 A | 11/1999 | Gerhardt | |
| 6,023,105 A * | 2/2000 | Youssef | 290/54 |
| 6,064,123 A | 5/2000 | Gislason | |
| 6,448,668 B1 * | 9/2002 | Robitaille | 290/54 |

* cited by examiner

*Primary Examiner*—Edward K. Look
*Assistant Examiner*—J. M. McAleenan

(57) ABSTRACT

A wind power generation apparatus of the present invention includes a wind turbine having a rotor diameter and a hub height. An artificial mound adjacent to the wind turbine has a length, a width and a height. The artificial mound is positioned to enhance the performance of the wind turbine by focusing wind on the turbine rotor. The dimensions of the artificial mound are determined according to the characteristics of the wind turbine.

19 Claims, 6 Drawing Sheets

WIND TURBINE ENHANCEMENT APPARATUS, METHOD AND SYSTEM

This application claims priority to Provisional Application Serial No. 60/270,704, filed on Feb. 22, 2001 and Provisional Application Serial No. 60/325,346, filed on Sep. 27, 2001.

FIELD OF THE INVENTION

The present invention relates generally to wind driven power generation plants and, more particularly, to an apparatus, method and system for directing wind into blades of a wind turbine to increase efficiency and power output.

BACKGROUND OF THE INVENTION

The conversion of natural energy, e.g., solar energy, wind energy, ocean tidal and wave energy, into electrical energy is well known. Using natural energy sources has become more desirable in recent years because of concerns about the effects of fossil fuels on the environment and also because of the increasing cost of fossil fuels. Further, it is widely recognized that fossil fuels are in limited supply, thus further emphasizing the need to exploit natural energy sources.

The most common apparatus for converting wind energy into useful power is the windmill, which typically includes a plurality of blades directly exposed to the wind and interconnected to rotate about a common horizontal axis. In traditional windmills, the rotational axis is permanently aligned with the prevailing wind direction. Accordingly, efficiency suffers when the wind varies from the prevailing direction.

More advanced windmills have axes that can be moved, either by servomotors or by direct reaction to the wind, into alignment with the wind. These modern windmills exhibit greater flexibility than traditional designs, but they require expensive support bearings and still suffer from important deficiencies that are inherent in windmills. For example, an electric generator directly coupled to the axis of a conventional windmill is exposed to outdoor elements and, therefore, is susceptible to a high rate of corrosion. In addition, access to these high-mounted generators for maintenance purposes is difficult. Furthermore, the large, rotating blades of conventional windmills pose a significant safety hazard so that windmills must be located in areas of low population density, often on remote windmill farms.

Although windmills are a well-known means for harnessing wind energy, windmills suffer from several inherent disadvantages. Tall towers must typically be constructed to accommodate large-diameter rotors and to position them high enough in the air stream to avoid the undesirable effects of air turbulence caused by obstructions at ground level. Further, the major mechanical components, i.e., the generator and associated mechanical linkage to the turbine, as well as the turbine controls and positioning apparatus, are typically located atop the tower as well, thus making maintenance difficult and expensive. Additionally, windmills only effectively extract energy from a circular cross section of an air stream, thereby substantially limiting their capability of extracting power from the wind stream.

The necessary size of economically feasible wind driven power plants for the generation of electric power introduces technical problems that require qualitatively new solutions. In particular, it is not possible to build plants that are competitive with other power generating systems by merely scaling up the small wind generation systems that are known in the art. Construction means suitable for a small wind generator would require massive support structures if applied to a very large windmill so that the capital investment in such a windmill would be prohibitive.

Modern windmills require wind speeds of 9–12 m/s (meters/sec.) to generate useful levels of electrical energy. Generated Electrical Power is directly proportional to the cube of the wind velocity. ($P=kV^3$). Hereinafter, windmills will be referred to as wind turbines. In the United States, only the Mt. Washington and Cold Bay, Ak. areas offer this intensity of average wind speed. Some isolated hilltops and canyons also offer potential for this level of wind speed; some of these sites are presently producing electricity at 10's of MW power levels.

Many coastal areas in the United States have wind speeds averaging 6–7 m/s and these winds come from the same direction practically year around. For example, the South Texas Coastal Area, from Brownsville to Galveston, has 6–8 m/s wind speeds from the Southeast (approximately 150 degrees) 12 months a year.

Assume a wind turbine provides 1 MW (1 million watts) at a wind speed of 12 m/s. Some simple arithmetic tells us that it will generate approximately 579 kW at a wind speed of 10 m/s, and 296 kW at a wind speed of 8 m/s. In other words, a 50% increase in wind speed provided 4 times the output power.

Placing wind turbines adjacent natural hilltops and canyons or valleys between hilltops may improve performance because of airfoil and Venturi effects. Unfortunately, very few of these natural areas provide the smooth surfaces for laminar airflow and the ideal shapes to maximize wind speed, and minimize turbulence and wind sheer. Often, the valley direction is contrary to the prevailing wind direction. In other locations, such as the Texas coastline, for example, no hills or valleys are available to enhance or direct the wind.

Referring now to the drawings and more particularly to FIG. 1, a wind turbine 10 according to the prior art is depicted. The wind turbine 10 has a rotor 11 that converts wind 12 into electrical power. The rotor is attached to the wind turbine 10 through a hub 13, which is situated at an elevation above the ground known as the hub height 14. The hub height 14 is critical to the design of the wind turbine 10 because it determines the clearance between the rotor 11 and the ground. The hub height 14 also affects the exposure of the rotor 11 to the wind 12.

As wind 12 passes across the rotor 11, the wind 12 causes the aerodynamic shape of the rotor 11 to rotate the hub 13, which in turn drives an electric generator. Total power generation from the wind turbine 10 depends in part on the speed, direction and air density of the wind 12 that impacts the rotor 11. A rotor diameter 18 determines how much wind 12 the wind turbine 10 captures and converts to electricity. For optimum power generation, the wind 12 will blow directly into the rotor 11 at a relatively high, constant velocity. Consequently, turbulence in the wind 12 may adversely affect power generation from the wind turbine 10 because turbulent wind 12 is not efficiently turning the rotor 11.

It would, therefore, be desirable to have an improved wind power generation apparatus that does not require an extraordinary amount of wind in any particular direction. Additionally, there is a need for an improved wind power generation apparatus that does not require a location in any particular geographic area having particular geological features. Also, there is a need for an improved wind power generation system that is less susceptible to inefficiencies caused by inherent variations in the wind.

SUMMARY OF THE INVENTION

A wind power generation apparatus of the present invention includes a wind turbine having a rotor diameter and a hub height. An artificial mound adjacent to the wind turbine has a length, a width and a height. The artificial mound is positioned to enhance the performance of the wind turbine by focusing wind on the turbine rotor. The dimensions of the artificial mound are determined according to the characteristics of the wind turbine.

In one embodiment, a wind power generation apparatus includes a wind turbine having a rotor diameter and a mound adjacent to the wind turbine. The mound has a height from 0.1 times to 3 times the rotor diameter. The wind turbine is positioned with respect to the mound to enhance the performance of the turbine.

In yet another embodiment, a method for increasing the performance of a wind turbine includes the steps of locating an artificial mound to direct wind to a rotor on the wind turbine and building the artificial mound to a height that focuses the wind on the rotor of the wind turbine.

In another embodiment, a method for increasing the performance of a wind turbine having a rotor includes the steps of locating a mound having a height of between about 0.1 times and 3 times the rotor diameter of the wind turbine to direct wind to the rotor and positioning the wind turbine to maximize the wind on the rotor of the wind turbine.

In yet another embodiment, a system for increasing the performance of a wind turbine includes a wind turbine and a mound adjacent to the wind turbine to direct wind into a rotor of the wind turbine. The height of the artificial mound is between about 0.1 times to 2 times the rotor diameter.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention is discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

Generally, present day wind turbines can be classified as radial flow turbines and axial flow turbines. In a radial flow turbine the airflow is substantially perpendicular to the axis of rotation of the turbine, while in an axial flow turbine the airflow is substantially parallel with the axis of rotation of the turbine.

Because wind is a substantially horizontal movement of the ambient air mass, a radial flow wind turbine can also be termed a vertical axis wind turbine, and an axial flow turbine can also be termed a horizontal axis wind turbine. As it will be readily appreciated by those skilled in the art, because of the practically continuously changing nature of wind direction, in order to attain acceptable efficiency an axial flow wind turbine must continuously be aligned to face the wind. In case of relatively large axial flow wind turbines the above-noted requirement can be satisfied only at relatively high cost of construction. This is because the relatively heavy turbine designed to be capable of rotating at a high speed on a horizontal axis, must be mounted to also pivot on a vertical axis.

Figure 1:
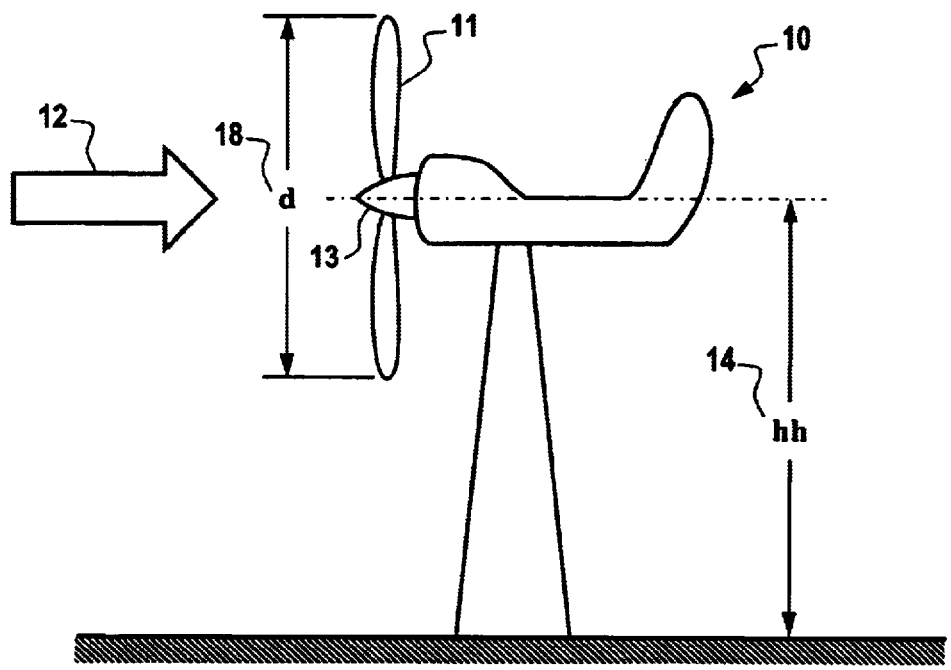
FIG. 1 is a prior art wind turbine.
Figure 2:
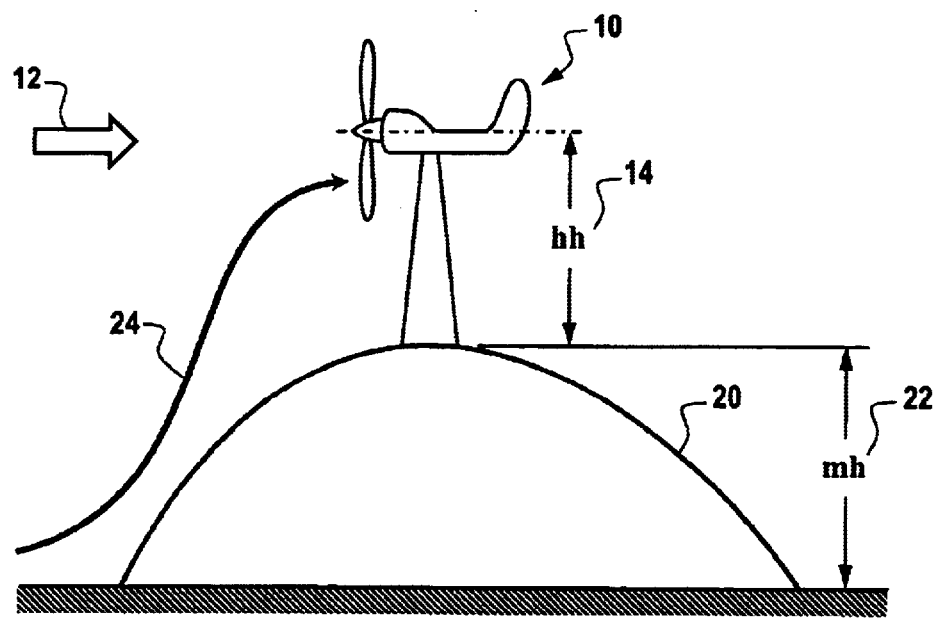
FIG. 2 is a side view of one embodiment of a wind power generation apparatus of the present invention.

Turning now to the present invention, in FIG. 2, the wind turbine 10 is located on a mound 20. The mound 20 may be an artificial structure or it may be a natural geographic feature. If the mound 20 is artificial, the mound 20 may be built to particular dimensions that enhance the performance of the wind turbine 10. For example, the mound 20 may be built to a mound height 22 that is proportional to the hub height 14 of the wind turbine 10. The mound height 22 may elevate the hub height 14 to an elevation that optimizes the exposure of the rotor 11 to the wind 12.

In some embodiments, the mound 20 may be built to direct the wind 12 into the rotor 11. A wind path 24 depicts how the mound 20 redirects wind 12 near the ground and focuses the wind 12 onto the rotor 11. Therefore, a greater volume of wind 12 is directed to the rotor 11. Additionally, the mound 20 may be shaped to have a profile that resembles an airfoil. According to Bernoulli's principles, the airfoil profile of the mound 20 may create an area of low pressure near the wind turbine 10. Consequently, the wind 12 travels to the wind turbine 10 at an increased velocity. As a result, the rotor 11 is exposed to a greater volume of wind 12 at a higher velocity, thereby increasing performance of the wind turbine 10.

A wind power generation apparatus of the present invention may be situated in locations that have been considered marginal or unacceptable for wind power generation. For example, locations that have light winds may now be used to generate power. The mound 20 may be built in these locations to increase the velocity of the wind 12 and focus the wind on the rotor 11 of a wind turbine 10. Therefore, wind turbines may be located in a variety of areas rather than only those having constantly high winds. Consequently, more wind turbines 10 may be economically built in many different locations. Because wind power is naturally clean, one significant result is reducing dependence on non-renewable energy sources that pollute the environment.

The present invention also has additional environmental benefits. For example, the mound 20 may be built of material that might otherwise be dumped in a landfill. Construction of the mound 20, may be similar to landfill construction except that the mound 20 may be built to optimize the performance of the wind turbine 10. Layers of landfill material, refuse, or soil may be piled in a marginally suitable area to redirect local winds into the rotor 11 of wind turbine 10.

In one embodiment, sand may be piled over refuse such as discarded Christmas trees, for example, to form the mound 20. In this particular example, the mound 20 may be located near a coastline to direct ocean breezes into the rotor 11 of the wind turbine 10. The sand used to construct the mound 20 is plentiful near the coastline. Therefore, building material expenses are decreased. Additionally, discarded Christmas trees are typically plentiful and cost-free. Another benefit is that the discarded trees might otherwise consume landfill space that could be used for more hazardous refuse. Not only does the mound 20 increase the power output of the wind turbine 10, the mound 20 also helps recycle refuse.

In another embodiment, the mound 20 may be constructed as a hollow or inflatable structure. Hollow structures may typically have a lightweight frame that is covered with a thin, lightweight material such as nylon or polymer sheets or reinforced fabric, for example. Other materials suitable for covering the frame will be apparent to those having ordinary skill in the art of building hollow structures. An inflatable structure, alternatively, may be built without a frame.

One advantage to using a hollow or inflatable structure for the mound 20 is that construction schedules may be more easily planned. Construction crews that build hollow or inflatable structures will not be delayed because of a shortage of necessary landfill material that may be required to build a particular mound 20. Additionally, in some cases, material and construction costs may be lower for hollow or inflatable structures. In areas that do not have a large quantity of landfill material or areas where environmentally sensitive conditions restrict movement of natural resources to build the mound 20, hollow or inflatable structures may provide the best solution for building the mound 20.

Another advantage to using hollow or inflatable structures to build the mound 20 is that the hollow or inflatable structures may be engineered to further enhance the wind directing characteristics of the mound 20. Hollow or inflatable structures having specific shapes may be designed and constructed to enhance and direct the wind at any particular location. For example, hollow or inflatable structures may be shaped to have airfoils, hemispheres, teardrops, or other shapes to enhance wind direction to multiple wind turbines 10. One turbine 10 may be located on top of each airfoil-shaped structure and one turbine 10 may be located between the structures to take advantage of the Venturi effect. Engineered structures may also be easier to build and shape than a mound 20 that is constructed from natural or landfill material.

Also, in contrast to a mound 20 that is constructed of natural materials, hollow or inflatable structures are not susceptible to erosion or other shape altering environmental conditions. Grasses or trees, for example, may grow on a mound 20 that is constructed of landfill material. Over time, these grasses or trees may degrade the wind directing efficiency of the mound 20. The surface of a hollow or inflatable structure, however, may be selected according to its ability to efficiently and effectively direct the wind.

Hollow or inflatable structures may also be specifically engineered to withstand a variety of environmental conditions. Generally, a design lifetime of greater than 30 years is desirable. Hollow or inflatable structures may be designed to withstand hurricane force winds and salt spray in coastal areas. The surface of the hollow or inflatable structure may also be designed to endure extreme solar radiation in a desert environment.

Another advantage of a mound 20 made from a hollow or inflatable structure is that the interior volume of the structure may be used for storage or shelter. Very large mounds 20 may have sufficient interior volume to store machinery, equipment, grain or a variety of objects that might otherwise require a separate structure. Renting the interior volume for storage may further defray the costs of construction.

The mound 20 may be built at a location that has wind 12 that is otherwise suitable for power generation. In some instances, the mound 20 may be built adjacent to an existing wind turbine 10. In this situation, the performance of the wind turbine 10 is increased. A smaller wind turbine 10 may be used to generate the same amount of power as a larger, more expensive wind turbine 10 with the addition of the mound 20. Similarly, an existing wind turbine 10 may supply increased power to consumers if the mound 20 is used to increase the velocity of the wind 12 and focus the wind 12 on the rotor 11 of the wind turbine 10.

Alternatively, a wind turbine 10 may be erected in a position that takes advantage of the wind enhancing effects of a natural mound 20. The natural mound 20 may have dimensions that are naturally proportional to the hub height 14 or rotor diameter 18 of the wind turbine 10. The natural mound 20 may also be modified to conform to optimum dimensions of the wind turbine 10. Landfill, soil, or refuse, for example, may be added to the natural mound 20 to modify the dimensions of the natural mound 20. Conversely, earth-moving equipment may be used to alter the dimensions of the natural mound 20 to enhance the performance of the wind turbine 10.

Figure 3:
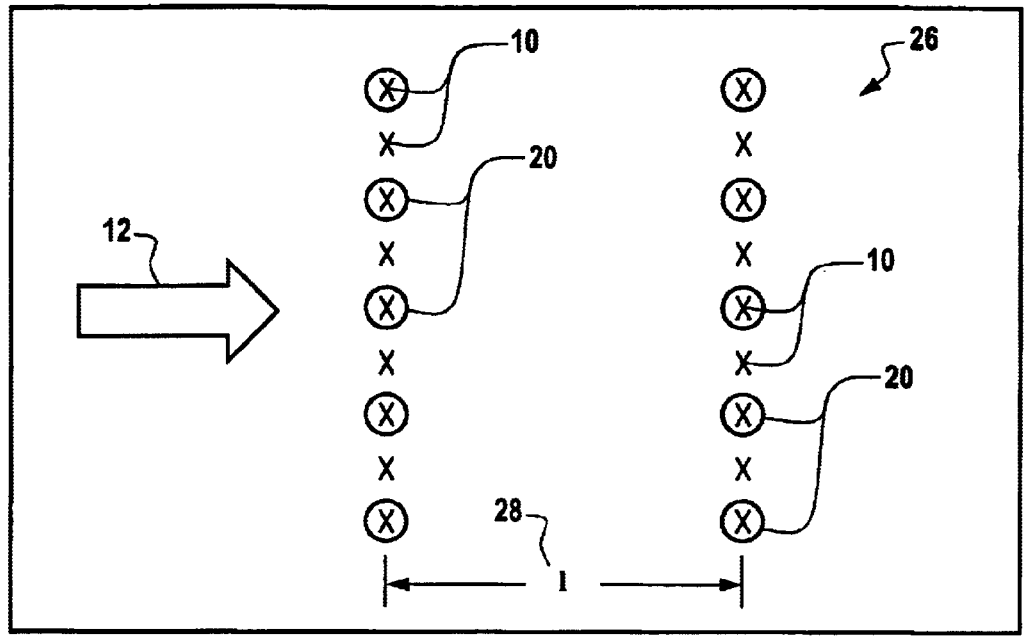
FIG. 3 is a plan diagram of one embodiment of a wind power generation system of the present invention.

Turning now to FIG. 3, a wind farm 26 is depicted. The wind farm 26 may contain an array of mounds 20 may be situated to direct wind 12 to a complimentary array of wind turbines 10. The array of mounds 20 may be designed and located to optimally direct the wind 12 and increase the velocity of the wind 12 into multiple wind turbines 10 (airfoil effect). The mounds 20 may also be designed and located to operate with other mounds 20 to increase the velocity of the wind into multiple wind turbines 10 (Venturi effect). For example, mounds 20 may be located to "funnel" wind 12 into a particular wind turbine 10 or group of wind turbines 10 to enhance the performance of the wind turbines 10.

The mounds 20 may be shaped and oriented to optimize exposure of the wind 12 to the wind turbines 10. The mounds 20, for example, may be hemispherical, teardrop-shaped or have an airfoil-like profile. The wind turbines 10 may be located on or about the mounds 20. Additionally, another row of wind turbines 10 and mounds 20 may be located at a distance 28 from the initial row of wind turbines 10 and mounds 20. The wind turbines 10 may be exposed to optimal wind 12 if the distance 28 is more than seven times the rotor diameter 18, for example.

Figure 4:
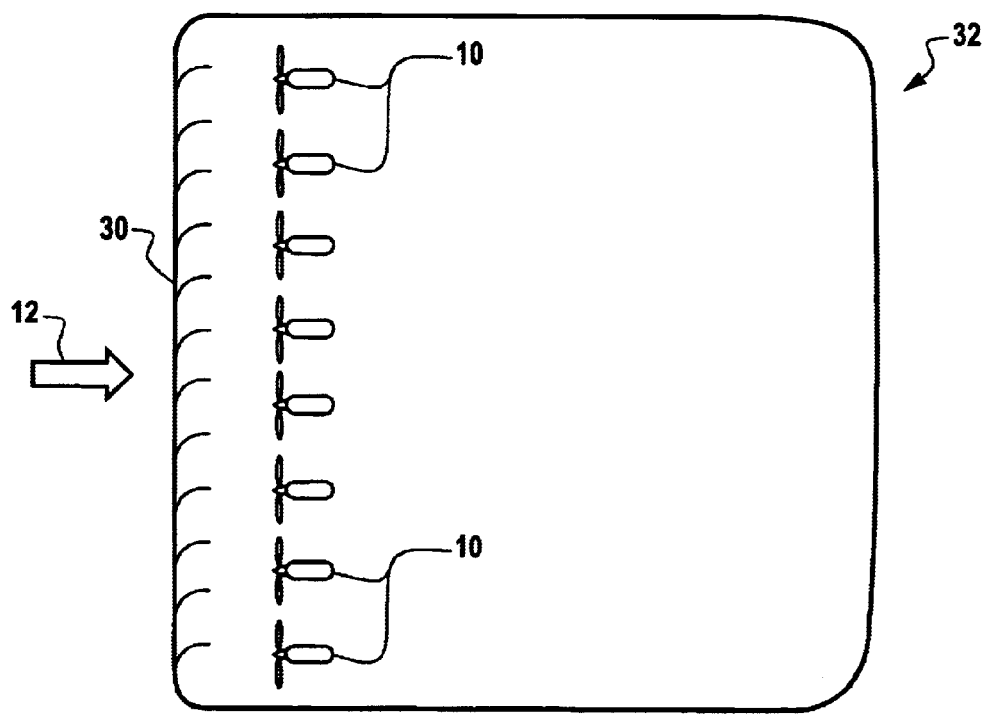
FIG. 4 is a plan view of one embodiment of a wind power generation system of the present invention.

FIG. 4 depicts an array of wind turbines 10 located proximate to the leading edge 30 of a modified landfill 32. In this particular embodiment, the modified landfill 32 has an airfoil-shaped profile that is designed to focus the wind 12 into the wind turbines 10. The modified landfill 32 has a mound height 22, which may be proportional to the hub height 14 or the rotor diameter 18 of the wind turbines 10. Multiple wind turbines 10 may be spaced along the leading edge 30 of the modified landfill 32 to take advantage of the wind enhancing properties of the length of the leading edge 30.

As an example, a study demonstrated performance improvement of a wind turbine installed on shapes ranging from a simulated unimproved landfill, a larger-improved landfill, and a hemisphere "hill" (airfoil effects). Also, performance improvement was demonstrated when a wind turbine was located between two hemispheres (Venturi effects). The results of this study are quantified in bar graphs, which are depicted in FIGS. 5–10.

Additionally, the study was designed to demonstrate that: 1) aerodynamic shapes minimize turbulence on a wind generator; and 2) the height of the shapes need be no larger than the diameter of the wind turbine's rotor to provide improved performance of a wind turbine.

The following is a brief summary of the study: a) all shapes and the wind turbine used in the experiments are scale models for use in a wind tunnel having a test chamber that has a 12 inch by 12 inch area normal to the inlet wind vector; b) the wind turbine was calibrated by installing it on the floor of the wind chamber and applying known wind velocities. Rotor Revolutions per Second (RPS) was measured versus applied wind velocity-feet per second (fps); c) all wind velocity increases that were measured by the wind turbine on or between the shapes, were reported relative to the inlet wind velocity; d) all wind turbine performance improvements were calculated and reported relative to how the wind turbine would have performed if it had been on the chamber floor instead of on or between a shape.

Generally, the study provided the following information: 1) installing the wind turbine on the windward edge of an unmodified landfill, whose height is ½ the rotor diameter, added little to the wind turbine's performance (104% of inlet wind velocity, or a power output at 112%); 2) installing a wind turbine on the windward edge of a modified landfill having a height equal to the rotor diameter adds considerable performance improvement (>135% of inlet velocity, or a power output at 250%); 3) installing a wind turbine on the top of a hemisphere having a radius equal to the rotor diameter, adds good performance improvement (>113% of inlet velocity, or a power output at 144%); and 4) installing a wind turbine between two hemispheres, whose radii are equal to the rotor diameter, adds considerable velocity improvement (>140% of inlet velocity, or a power output at 275%).

Figure 5:
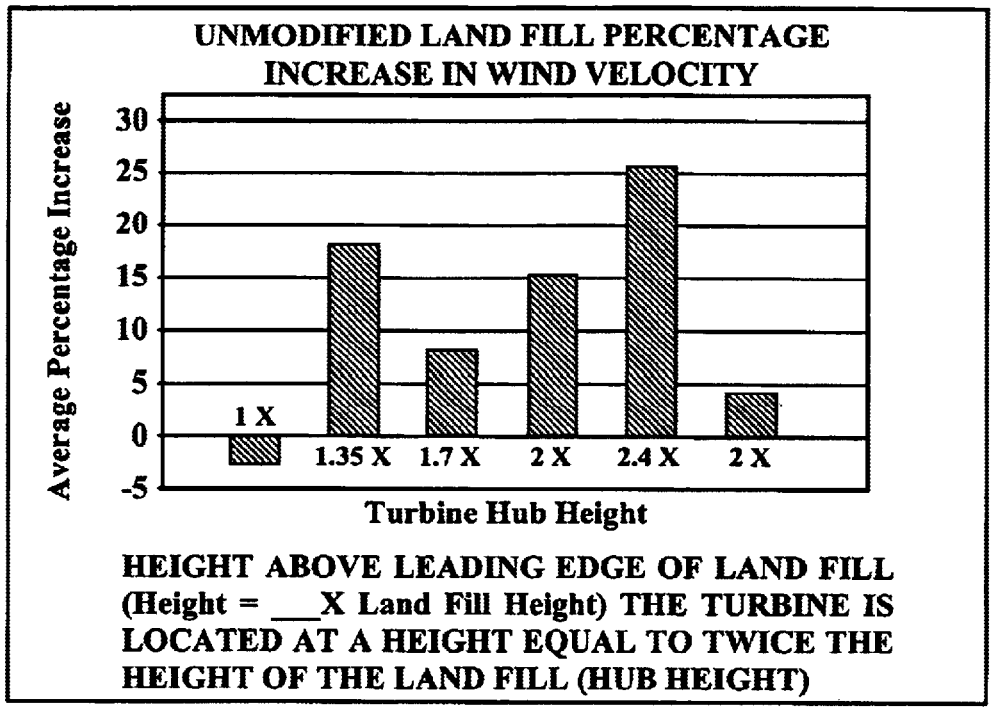
FIG. 5 is a bar graph that depicts performance characteristics of one embodiment of the present invention.

FIG. 5 depicts results from the study wherein the wind turbine is located on the leading edge or the windward side of a simulated landfill, which has a typical, unmodified profile. The windward edge of the landfill is not modified to present an airfoil shape. Small pitot tubes were located at 1, 1.35, 1.7, 2, and 2.4 times the landfill height to directly measure the wind speed. A wind turbine whose turbine diameter is twice the landfill height is located with a hub height of 2 times the landfill height. Wind turbine RPS measurements indicated a four percent increase in wind speed at the hub. This result indicates that a wind turbine having a rotor diameter that is twice the height of the landfill gains only a small percentage increase in wind speed at the hub.

Figure 6:
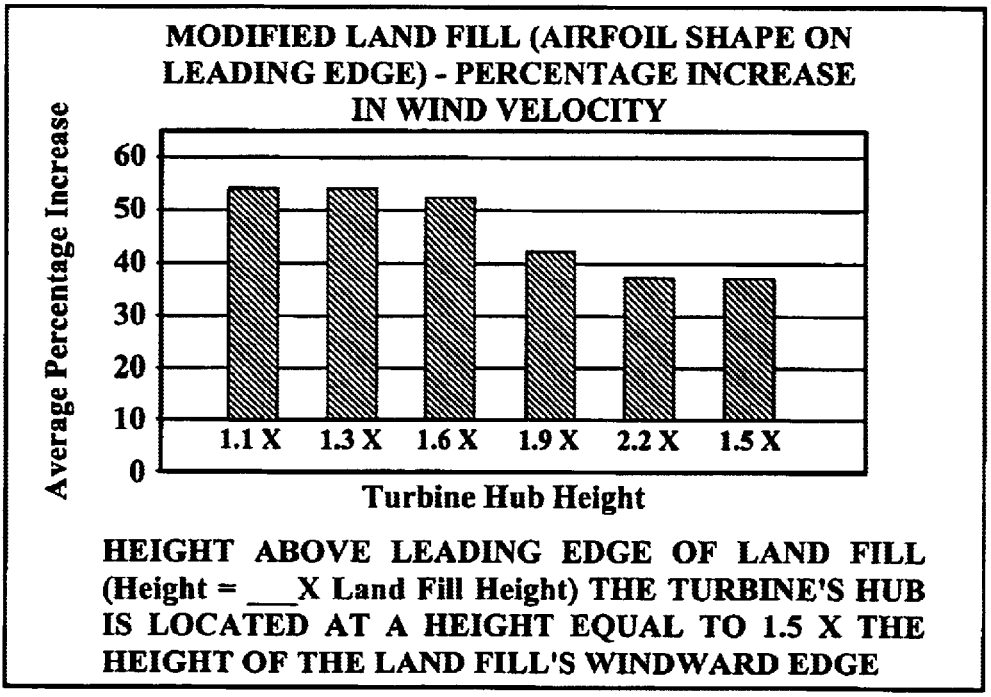
FIG. 6 is a bar graph that depicts performance characteristics of one embodiment of the present invention.

FIG. 6 depicts the results from the study wherein the wind turbine is located on or about a simulated landfill, which has a modified, airfoil-shaped profile. The wind turbine was used to measure wind velocity at the leading edge and windward side of the airfoil-shaped landfill. Small pitot tubes are located at 1.1, 1.3, 1.6, 1.9, and 2.2 times the landfill height to make a direct measurement of the wind speed. A wind turbine 12 having a turbine diameter 18 equal to the landfill height is located with a hub height of 1.5 times the landfill height 22. A 38% increase in wind speed at the hub implies that a large percentage increase in wind speed results when the rotor diameter is equal to or less than the height of the landfill. Therefore, a large percentage increase in wind speed results when the windward edge of the landfill is modified to present an airfoil type of shape.

Figure 7:
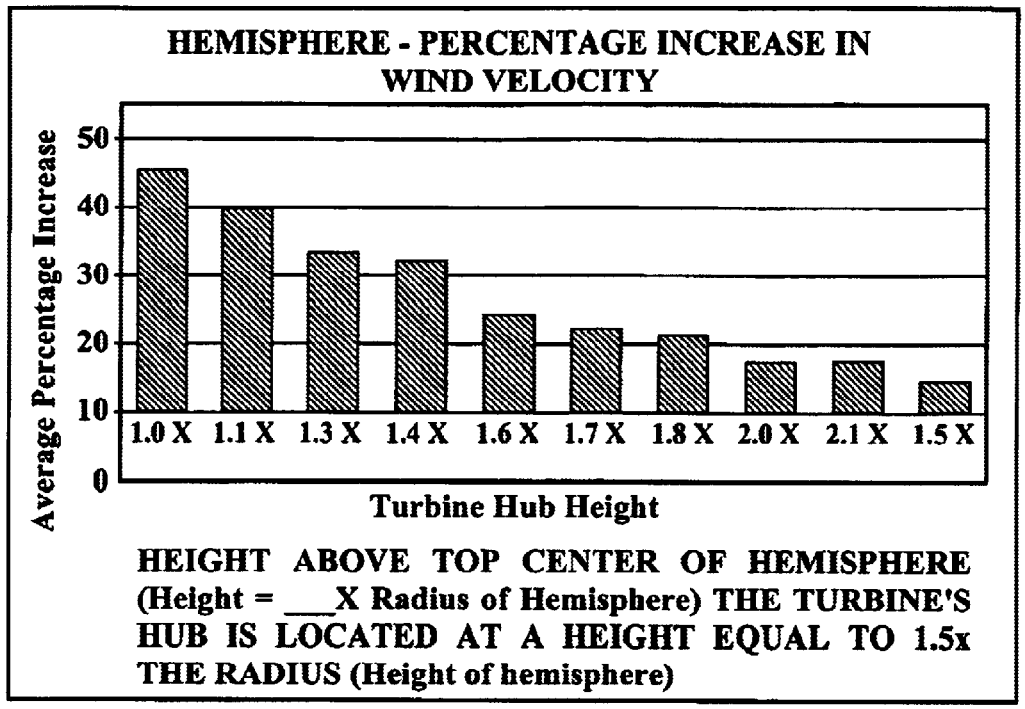
FIG. 7 is a bar graph that depicts performance characteristics of one embodiment of the present invention.

FIG. 7 depicts the results from the study wherein the wind turbine is located on a hemisphere. Pitot tube measurements were taken at locations of 1, 1.1, 1.3, 1.4, 1.6, 1.7, 1.8, 2, and 2.1 times the hemisphere height to directly measure the wind speed. A wind turbine whose turbine diameter is equal to the radius of the hemisphere is located with a hub height of 1.5 times the hemisphere height. The wind turbine rotor is located slightly forward of top center in the windward direction. A 13% increase in wind speed at the hub is an improvement, but the result implies that the hemisphere is not an optimum shape. Consequently, the hemisphere requires a radius larger than the rotor diameter to achieve a higher percentage velocity increase.

Figure 8:
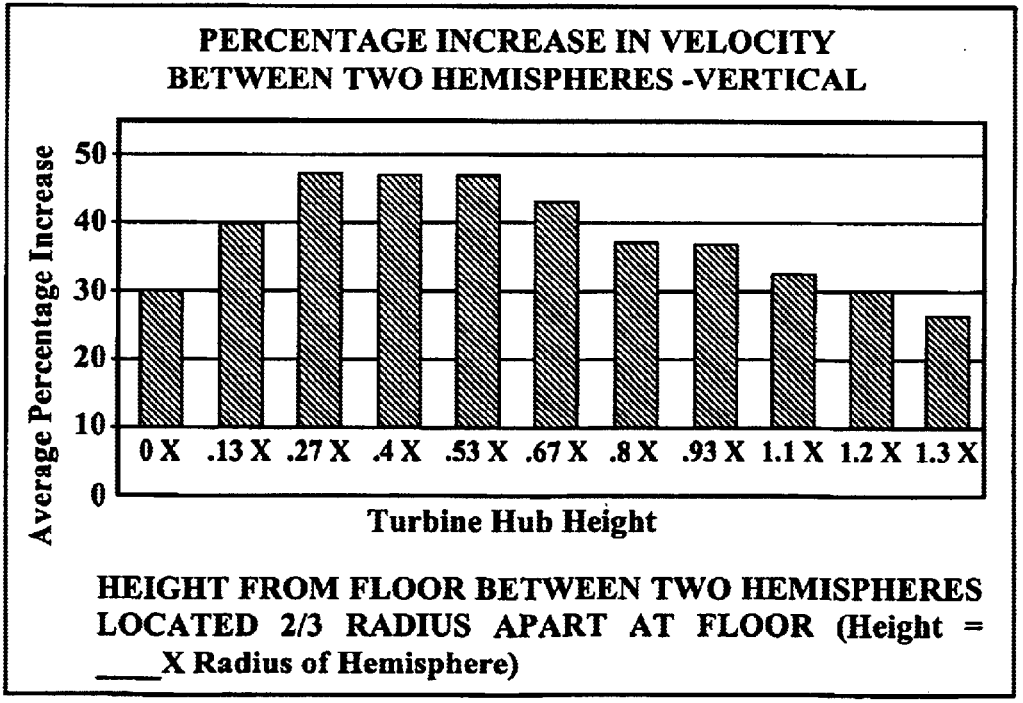
FIG. 8 is a bar graph that depicts performance characteristics of one embodiment of the present invention.
Figure 9:
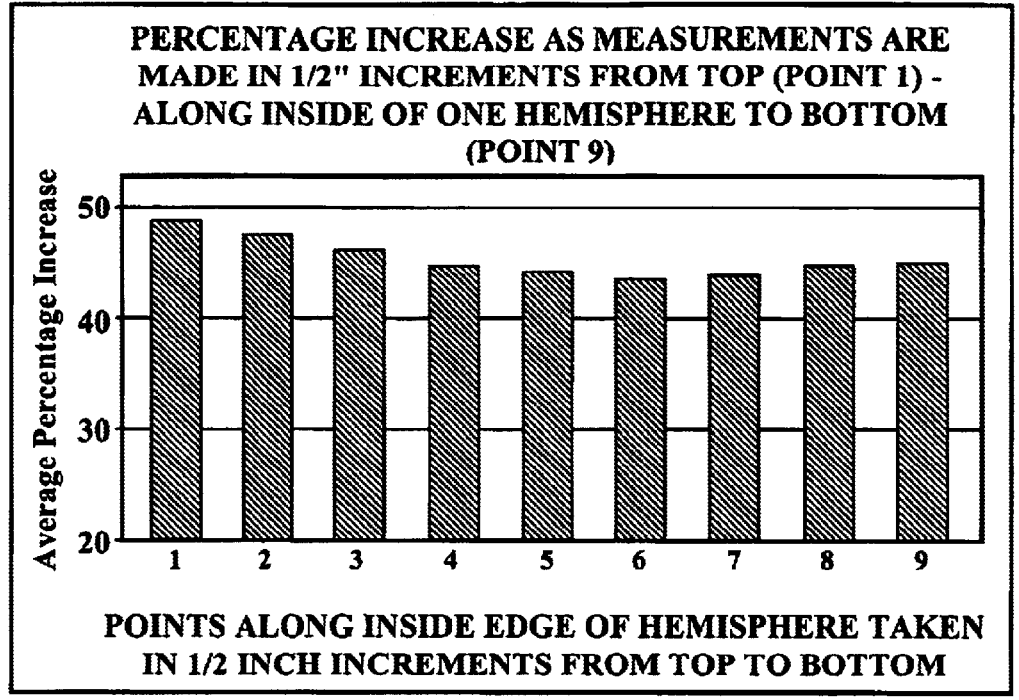
FIG. 9 is a bar graph that depicts performance characteristics of one embodiment of the present invention.
Figure 10:
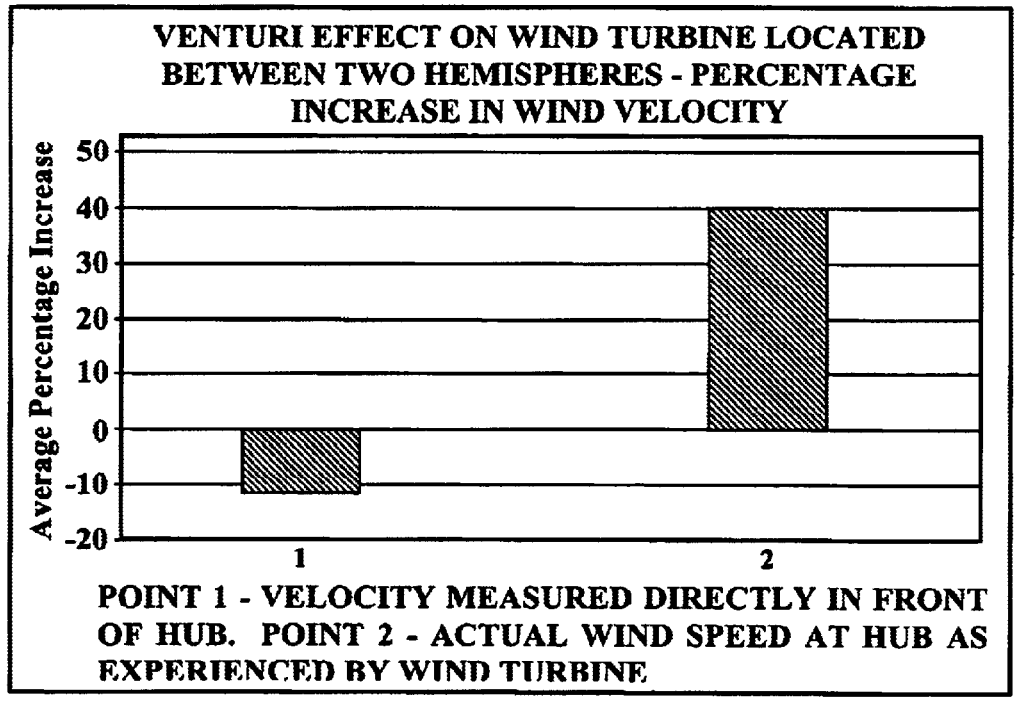
FIG. 10 is a bar graph that depicts performance characteristics of one embodiment of the present invention.

FIGS. 8, 9 and 10 depict the results from the study wherein the wind turbine is located between two hemispheres. The results depicted in FIGS. 8 and 9 were obtained using a pitot tube at various vertical and horizontal locations between the two hemispheres. The results depicted in FIG. 10 were obtained using a pitot tube to measure the wind speed directly in front of the hub of a wind turbine. The actual wind velocity experienced at the hub of the wind generator was also measured. The turbine diameter is equal to the radius of the identical hemispheres. The hemispheres are located to provide minimum clearance for the turbine blades. A 40% increase in hub velocity implies that two hemispheres, whose radii are equal to or greater than the rotor diameter, and are located less than ⅔ diameter apart, provide excellent amplification of wind velocity. Consequently, locating the wind turbine between two hemispherical mounds may significantly increase power output because of the Venturi effect produced by the mounds.

Figure 11:
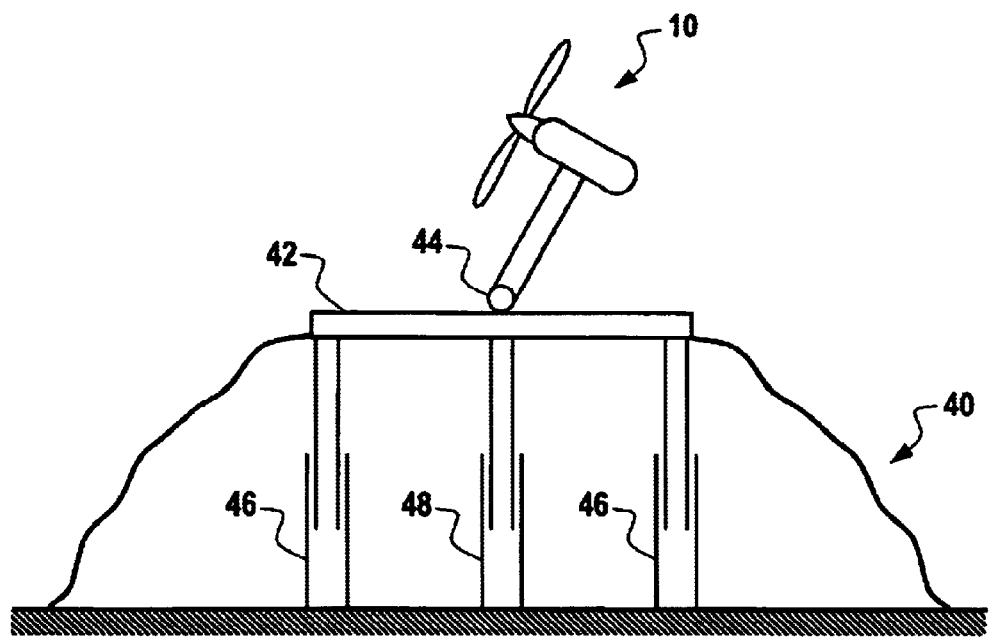
FIG. 11 is a cutaway side view of a self-erecting wind turbine according to one embodiment of the present invention.

Turning now to FIG. 11, a partially inflated hollow dome 40 is depicted. The hollow dome 40 can support the wind turbine 10 and may serve to erect the wind turbine 10 to a desired height. The wind turbine 10 may be attached to a platform 42, which rests on the surface of the hollow dome 40. A pivoting tower 44 may be used to evenly distribute the weight of the wind turbine 10 during inflation of the hollow dome 40. The pivoting tower 44 may also be used to lower the wind turbine 10 for routine maintenance or repairs.

One or more tower jacks 46 may be used to assist the raising and lowering of the platform 42 and the wind turbine 10. A telescoping support tower 48 may be used to stabilize and support the wind turbine 10 after the hollow dome 40 has been fully inflated. The telescoping support tower 48 may be much less costly to construct and erect than a conventional tower that elevates the wind turbine 10 to similar heights. Although the telescoping support tower 48 may be used in conjunction with the hollow dome 40 to support the wind turbine 10, one embodiment of the present invention contemplates only the hollow dome 40 supporting the wind turbine 10, the platform 42 and the resulting wind loads.

The platform 42 may preferably be a hexagonal structure made from honeycomb carbon fiber. Other shapes and materials may be used to optimize the strength and reduce the overall weight of the platform 42. The platform 42 may also have a track (not shown), which allows the pivoting tower 44 and wind turbine 10 to be moved across the surface of the platform 42 to center the weight of the pivoting tower 44 and wind turbine 10 on the platform 42.

The tower jacks 46 may be temporarily housed within the hollow dome 40 to assist raising the platform 42, the pivoting tower 44 and the wind turbine 10. If multiple hollow domes 40 are used in the wind farm 26 depicted in FIG. 3, the tower jacks 46 may be moved among the various hollow domes 40 to raise or lower the wind turbines 10. Costs, therefore, may be saved because each hollow dome 40 in the wind farm 26 does not require dedicated tower jacks 46.

Figure 12:
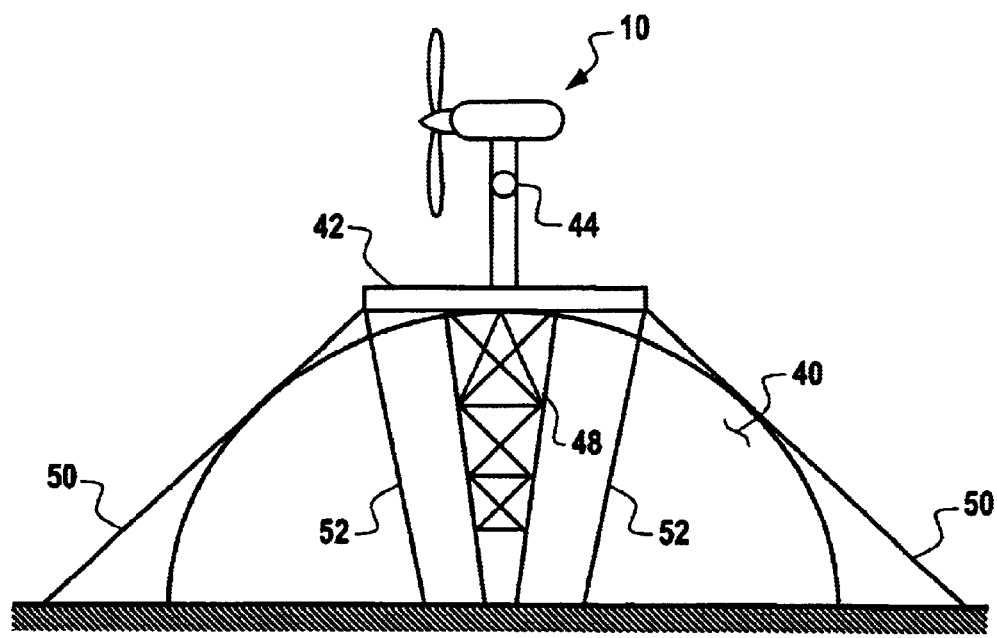
FIG. 12 is a cutaway side view of a self-erecting wind turbine according to one embodiment of the present invention.

The inflated hollow dome 40 is depicted in FIG. 12. The telescoping support tower 48 is extended between the ground and the platform 42. The telescoping support tower 48 may be made from steel, aluminum, carbon fiber or other suitable material known to those having ordinary skill in the art of tower construction. Alternatively, the platform 42 may be stabilized by a counterweight system (not shown), which serves to counteract wind loads on the wind turbine 10 and hollow dome 40. External and internal guy wires 50, 52 may also be attached to the hollow dome 40, the platform 42 and the wind turbine 10 to stabilize the wind turbine 10.

The inflatable hollow dome 40 may be supported by internal air pressure and may be designed in a variety of wind-enhancing shapes. Hemispherical and elliptical shapes, however, are typical. The inflatable hollow dome 40 may be fabricated from fabric, polymer sheets or the like. Other materials and construction techniques will be apparent to that having ordinary skill in the art of dome manufacturing. The height of the inflatable dome 40 may be adjusted according to desired wind enhancement. The height of the hollow dome 40, however, may typically be approximately equal to the rotor diameter of the wind turbine 10.

In addition to the wind enhancing features described above, the inflatable hollow dome 40 also saves the costs of erecting tall towers to support the wind turbines 10. The materials required to build tall towers are expensive, heavy and difficult to manufacture and transport. In this particular embodiment of the present invention, the hollow dome lifts and supports the wind turbine 10. If additional stability or support is required the telescoping support tower 48 may be built within the hollow dome 40 to support and stabilize the wind turbine. Even if the telescoping support tower 48 is used, it is less expensive to construct than a tall tower that must support the wind turbine 10 and the related wind loads.

Furthermore, erecting tall towers typically requires using an exceptionally tall crane, which is significantly more costly to provide. In contrast, average-sized cranes may be used to erect the inflatable hollow dome 40. Not only does the inflated hollow dome 40 increase the power output of the wind turbine 10, inflating the hollow dome 40 lifts the wind turbine 10 to the desired height without requiring an exceptionally tall crane.

Whereas the invention has been shown and described in connection with the preferred embodiment thereof, it will be understood that many modifications, substitutions and additions may be made which are within the intended broad scope of the appended claims. There has therefore been shown and described an improved wind power generation apparatus, method and system that accomplishes at least all of the above stated advantages.

What is claimed is:

1. A self-erecting wind-powered generator comprising:
   a wind turbine having a rotor;
   a platform attached to the wind turbine; and
   an inflatable structure configured to support the platform and the wind turbine above ground, wherein the structure is configured to redirect a wind path near the ground providing a greater wind velocity to the rotor, thereby increasing performance of the wind turbine.

2. The self-erecting wind-powered generator of claim 1 wherein the inflatable structure has a generally hemispherical shape.

3. The self-erecting wind-powered generator of claim 1 wherein one or more tower jacks are removably attached to the platform to raise the platform above the ground.

4. The self-erecting wind-powered generator of claim 1 wherein the inflatable structure is fabric.

5. The self-erecting wind-powered generator of claim 1 wherein a tower is attached to the platform, the tower extending from the platform to the ground.

6. The self-erecting wind-powered generator of claim 1 wherein a counterweight is attached to the platform.

7. The self-erecting wind-powered generator of claim 1 wherein air pressure within the inflatable structure supports the wind turbine.

8. The self-erecting wind-powered generator of claim 1 wherein the inflatable structure has a generally teardrop shape or a generally airfoil shape.

9. The self-erecting wind-powered generator of claim 1 wherein the height of the inflatable structure is proportional to a rotor diameter and a hub height.

10. The self-erecting wind-powered generator of claim 1 wherein the height of the inflatable structure is between about 0.1 times to 2 times the rotor diameter.

11. The self-erecting wind-powered generator of claim 1 wherein there are two or more wind turbines.

12. The self-erecting wind-powered generator of claim 1 wherein the inflatable structure has a height from 0.1 times to 3 times the rotor diameter.

13. The self-erecting wind-powered generator of claim 1 wherein the inflatable structure has a height about equal to the rotor diameter.

14. A method for erecting a wind turbine comprising:
   providing an inflatable structure;
   attaching the inflatable structure to a wind turbine; and
   attaching a platform to the wind turbine, wherein the inflatable structure is configured to support the platform and the wind turbine above ground; and
   inflating the inflatable structure to lift the wind turbine above the ground, wherein the structure is configured to redirect a wind path near the ground providing a greater wind velocity to the rotor, thereby increasing performance of the wind turbine.

15. The method of claim 14 wherein two or more inflatable structure are provided.

16. The method of claim 14 further comprising the step of attaching the wind turbine to a platform.

17. The method of claim 14 further comprising the step of erecting a tower between the wind turbine and the ground.

18. The method of claim 14 further comprising the step of attaching a counterweight to the wind turbine.

19. A wind turbine comprising:
   a generator and a tower,
   wherein the wind turbine has a rotor with a rotor diameter,
   an inflatable structure configured to be placed at the base of the wind turbine, wherein the height of the inflatable structure is between about 0.1 times to 2 times the rotor diameter, whereby the structure is configured to redirect a wind path near the ground providing a greater wind velocity to the rotor, thereby increasing performance of the wind turbine.

* * * * *